US005954460A

United States Patent [19]
Degen et al.

[11] Patent Number: 5,954,460
[45] Date of Patent: Sep. 21, 1999

[54] DRILL STAND

[75] Inventors: Klemens Degen, Weibern; Stefen Blank, Neuwied, both of Germany; Edmund Apolinski, Chicago; David R. Daniels, Lake Villa, both of Ill.

[73] Assignee: Wolfcraft GmbH, Kempenich, Germany

[21] Appl. No.: 08/987,102

[22] Filed: Dec. 8, 1997

[51] Int. Cl.[6] ..................... B23B 45/14

[52] U.S. Cl. ..................... 408/112; 408/135; 408/241 S; 408/712

[58] Field of Search ..................... 408/14, 16, 110, 408/111, 112, 135, 136, 241 S, 712

[56] References Cited

U.S. PATENT DOCUMENTS

| | | | |
|---|---|---|---|
| 3,837,757 | 9/1974 | Levine | 408/236 |
| 4,582,105 | 4/1986 | Wolff | 408/712 |
| 5,062,743 | 11/1991 | Wieland et al. | 408/135 |
| 5,096,340 | 3/1992 | Forsgren | 408/241 S |
| 5,127,775 | 7/1992 | Broadbent et al. | 408/241 S |
| 5,660,508 | 8/1997 | Schneider | 408/111 |

FOREIGN PATENT DOCUMENTS

| | | | |
|---|---|---|---|
| 1602979 | 10/1970 | Germany | 408/136 |
| 2545197 | 4/1977 | Germany | 408/135 |
| 3134564 | 3/1983 | Germany | 408/112 |

*Primary Examiner*—Daniel W. Howell
*Attorney, Agent, or Firm*—Hill & Simpson

[57] ABSTRACT

An improved drill stand is provided which includes a stand column slidably connected to a bearer unit so that the position or height of the bearer unit with respect to the stand column may be adjusted. The bearer unit includes a gear segment which is biased toward the retracted position by a reset spring. The gear segment is meshed with a geared slide rod. The geared slide rod may be disposed parallel to or perpendicular to the stand column. The slide rod is connected to a machine receiving part. Rotation of the gear segment with respect to the bearer unit against the bias of the reset spring results in movement of the slide rod in the machine receiving part towards an extended position. The machine receiving part is also connected to a bit stop rail. The bit stop rail is connected to a bit stop. The position of the bit stop along the bit stop rail is also adjustable. Movement of the machine receiving part towards the extended position is limited by engagement of the bit stop with the bearer unit.

20 Claims, 12 Drawing Sheets

DRILL STAND

FIELD OF THE INVENTION

The present invention relates to a drill stand and, more specifically, to drill stands having a vertical stand column on which a bearer unit is arranged in a height-adjustable fashion. Still more specifically, the present invention relates to such drill stands having a bearer unit with a machine receiving part that can be moved either parallel to the stand column or perpendicular to the stand column.

BACKGROUND OF THE INVENTION

A drill stand, in which a stand column extends from a foot part, and in which a bearer unit is arranged in height-adjustable fashion on the stand column, is known from the German laid open print 33 24 428. In this drill stand, the drive machine is integrated in the bearer unit. The bearer unit bears a slide or connecting rod that can be moved parallel to the stand column by actuating an actuating arm. A drill chuck is arranged at the end of the slide rod. The slide rod itself is penetrated by the drive shaft.

U.S. Pat. No. 3,837,757 discloses a drill stand with a stand column that projects vertically from a foot. A bearer unit is arranged in height-adjustable fashion on the stand column. A machine head can be moved vertically by means of an actuating arm.

U.S. Pat. No. 2,876,663 discloses a drill stand for a drill machine in which differently provided mounting means for fastening the machine are provided on the slide rod.

SUMMARY OF THE INVENTION

The present invention relates to a drill stand having a stand column on which a bearer unit is arranged in height-adjustable fashion, whereby the bearer unit has a machine receiving part that can be moved parallel to the stand column against the force of a reset spring until it meets an adjustable bit stop or depth stop. The machine receiving part is fashioned as an exchangeable adapter at the end side, arranged on a slide rod. A bit stop rail runs through a guide opening. By this means, a supportive rotational securing of the machine adapter is ensured. The machine, which can be a drill, can be held by the adapter. However, it is also provided that the adapter has a transmission shaft with a shaft projection or dog that is clamped into the chuck of the machine. The guide opening is preferably allocated to the bearer unit. The bit stop rail is then allocated to the machine receiving part. The machine receiving part can be fashioned with an angular shape. An angle limb can thereby comprise receiving means for receiving the machine. The other angle limb can comprise the fastening means with which the machine receiving part can be fastened to the slide rod.

The invention also relates to a drill stand with a stand column on which a bearer unit is arranged in height-adjustable fashion. The bearer unit has a machine receiving part that can be moved parallel to the stand column, against the force of a reset spring, until it meets an adjustable bit stop. This machine receiving part is arranged at the end side on the slide rod. A bit stop rail is located on the machine receiving part, and is guided in a guide opening of the bearer unit. The machine receiving part preferably has plug openings into which the end segments of the slide rod or, respectively, bit stop rail can be plugged. The bit stop rail preferably has bearing shoulders on which projections of the bit stop rail can rest. The slide rod and/or bit stop rail are connected with the machine receiving part by means of screw connections at the face. On the face opposite thereto, a mounting bracket for a drill can be attached. For the affixing of the machine, a mounting loop can be located on the mounting bracket. The slide rod is preferably driven by an actuating arm that includes a rotatable toothed segment. The teeth of the toothed segment engage with a toothing of the slide rod. The reset spring can be fashioned as a spiral spring, and can act on the shaft of the toothed wheel. The bit stop can be fashioned as a shoe that can be positioned in displaceable fashion on the bit stop rail, using positioning screws. In a variation of the invention, the receiving limb of the machine receiving part can be fashioned with a tension collar, so that the neck of a drill can thereby be surrounded and clamped. A further variant of the invention provides a collar that extends around the receiving opening so as to form a step. The plug-in end of the bit stop or, respectively, slide rail can have a profile that deviates from the round. The bit stop rail and slide rod run parallel to one another, and form a two-rail guide for the machine reception. The plastic housing can also be fastened in height-adjustable fashion to the stand column in a position rotated by 90°. For this purpose, the housing has a through-going opening in the broad side for the stand column, in the region of the clamping screw. In this rotated position, the motor shaft lies horizontally.

In an embodiment, the present invention provides a drill stand that includes a stand column that is slidably connected to a bearer unit so that the position of the bearer unit on the stand column may be adjusted. The bearer unit includes a gear segment that is enmeshed with a geared slide rod. The slide rod is removably connected to a machine receiving part. The gear segment engages a reset spring which biases the gear segment, the slide rod and the machine receiving part into a withdrawn position. Rotation of the gear segment with respect to the bearer unit and against the bias of the reset spring results in movement of the slide rod and the machine receiving part towards a second extended position. The machine receiving part is removably connected to a bit stop rail. The bit stop rail is connected to a bit stop. The position of the bit stop along the bit stop rail is adjustable. Movement of the machine receiving part towards the second extended position is limited by engagement of the bit stop with the bearer unit.

In an embodiment, the machine receiving part is easily disconnected from the bearer unit by disconnecting the machine receiving part from the slide rod and the bit stop rail so that the machine receiving part can be easily exchanged with a differently configured machine receiving part. In such an embodiment, the machine receiving part is equivalent to an exchangeable adaptor.

In an embodiment, the bearer unit further comprises a guide opening through which the bit stop rail extends. Movement of the machine receiving part towards the second extended position is limited by engagement of the bit stop with the bearer unit at the guide opening.

In an embodiment, the guide opening further comprises a space disposed between two guide webs and the movement of the machine receiving part towards the second extended position is limited by engagement of the bit stop with the guide webs of the guide opening.

In an embodiment, the machine receiving part includes two limbs, a first receiving limb for connection to a tool and a second receiving limb for connection to the bit stop rail and the slide rod.

In an embodiment, the machine receiving part comprises a first plug-in opening for receiving an end of the slide rod and a second plug-in opening for receiving an end of the bit stop rail.

In an embodiment, the slide rod and the bit stop rail are connected to the machine receiving part by screws.

In an embodiment, the position of bit stop along the bit stop rail is secured by a screw.

In an embodiment, the bearer unit includes a wall disposed adjacent to the bit stop and said wall includes a scale for indicating the position of the bit stop with respect to the bearer unit.

In an embodiment, the bit stop rail and the guide rod have non-circular cross sections.

In an embodiment, the slide rod is disposed perpendicular to the stand column.

In an embodiment, the slide rod is disposed parallel to the stand column.

In an embodiment, the bearer unit is held in position against the stand column with a clamping screw.

It is therefore an advantage of the present invention is to provide a drill stand whereby both the bearer unit and the machine receiving part are height-adjustable.

Yet another advantage of the present invention is to provide a drill stand whereby the bearer unit is height-adjustable with respect to the drill stand and the positioning of the machine receiving part is adjustable with respect to the bearer unit and therefore with respect to both the bearer unit and stand column.

Other objects and advantages of the present invention will become apparent upon reading the following detailed description, the appended claims and upon reference to the accompanying drawings.

BRIEF DESCRIPTION OF THE DRAWINGS

For a more complete understanding of the invention, reference should now be made to the embodiments illustrated in greater detail in the accompanying drawings described below by way of examples of the invention.

In the drawings.

Figure 1:
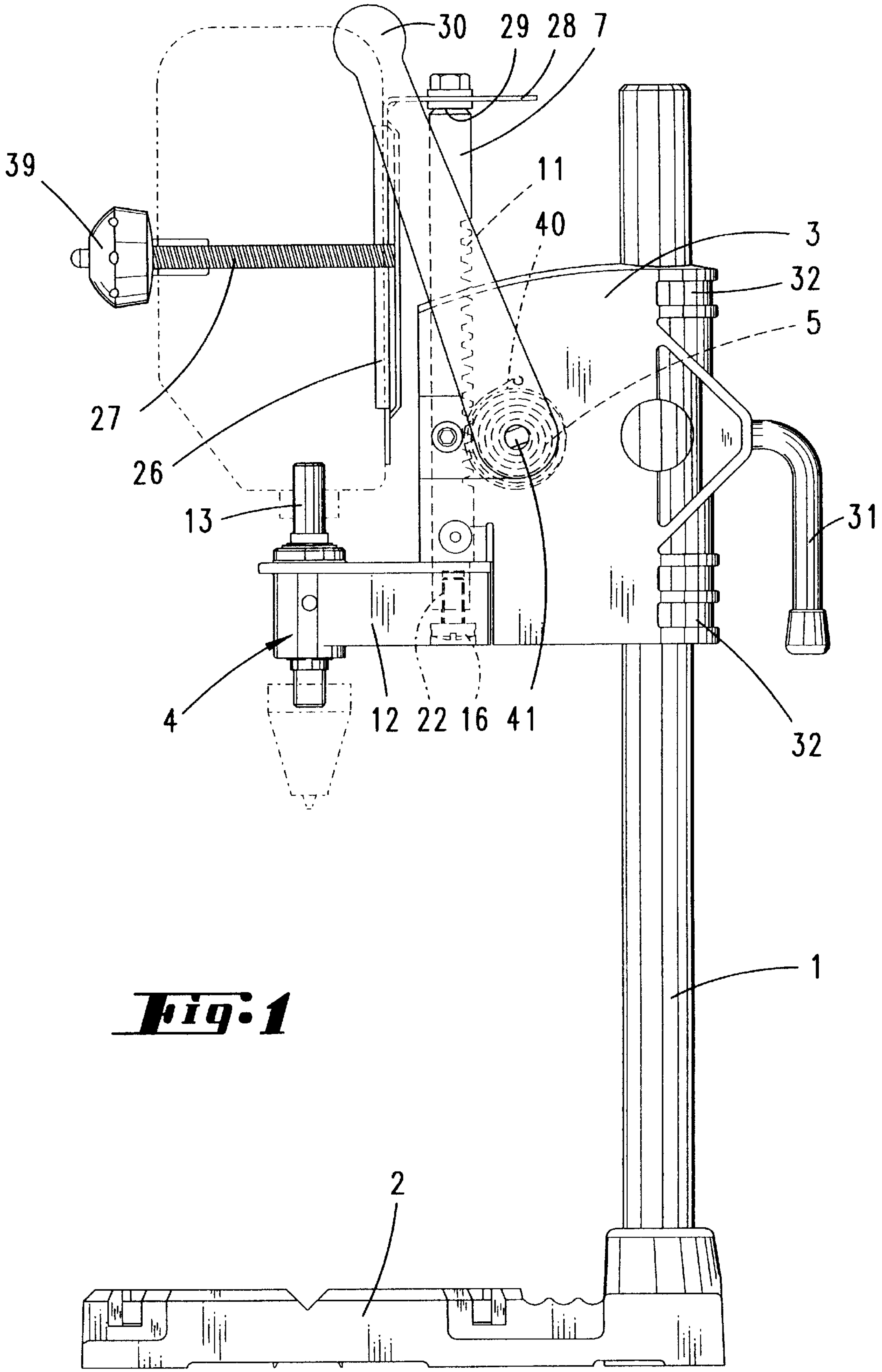
FIG. 1 is an elevational view of a first exemplary embodiment of the invention.
Figure 2:
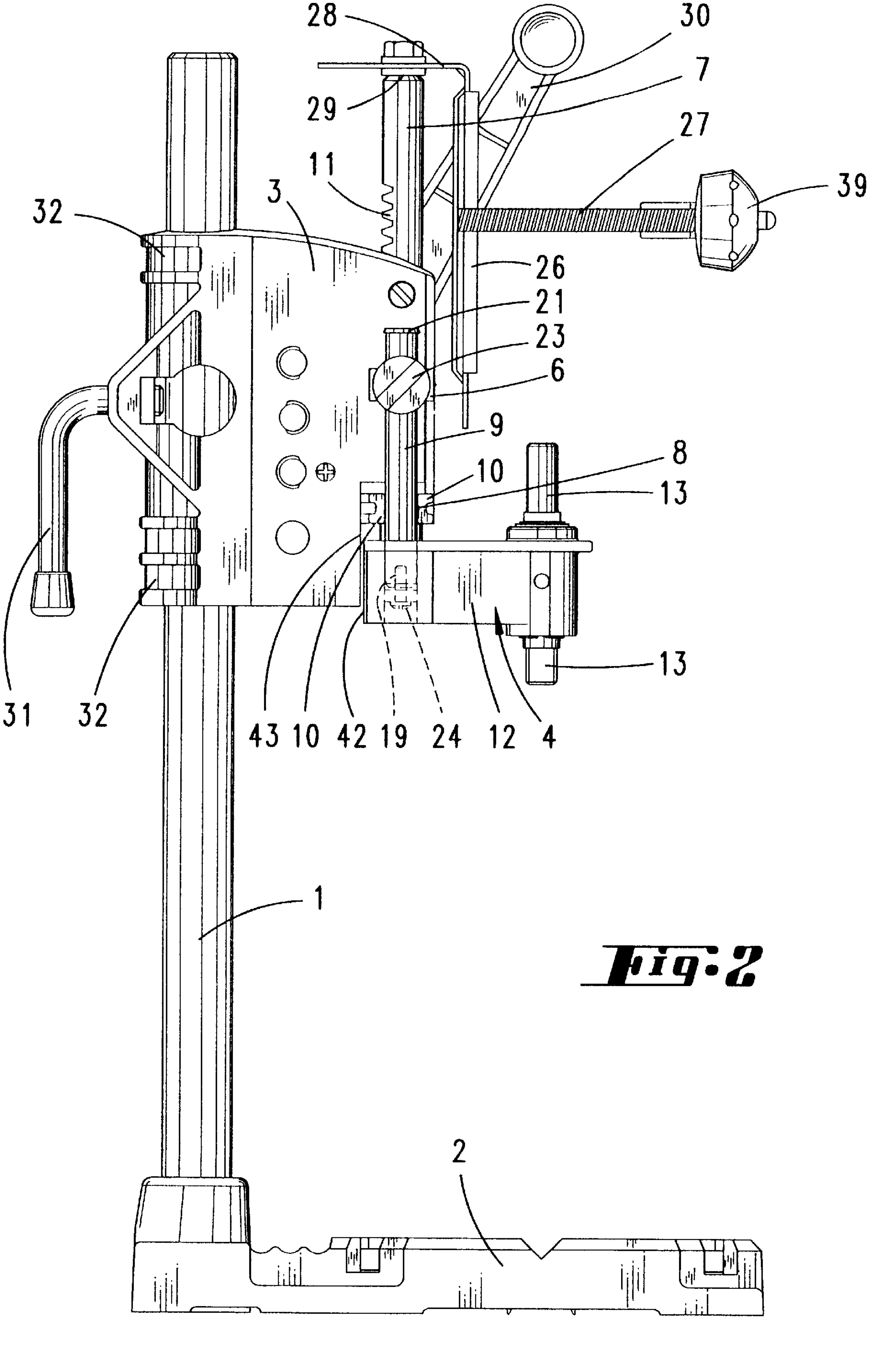
FIG. 2 is a rear view of the embodiment shown in FIG. 1.
Figure 3:
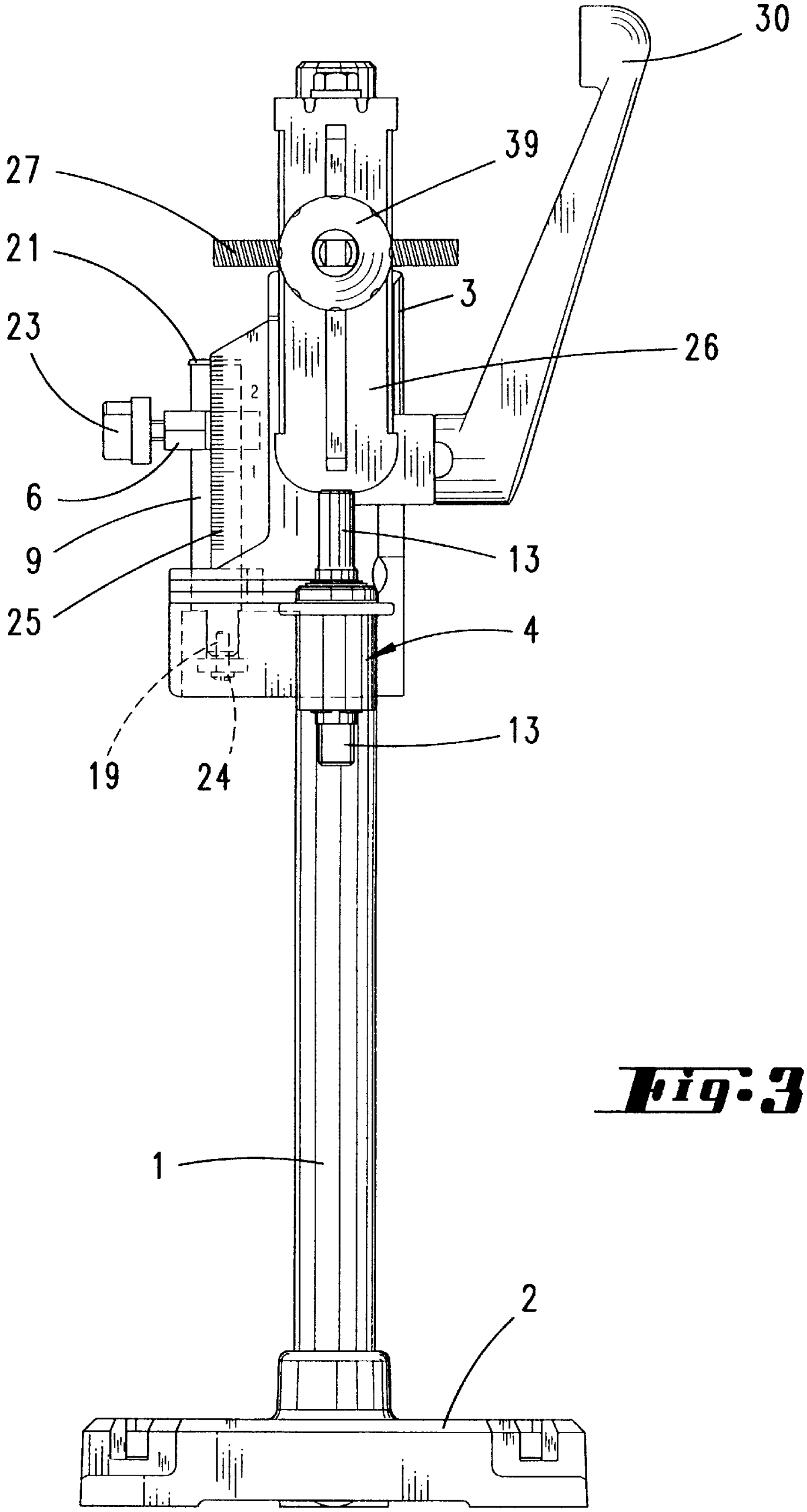
FIG. 3 is a side view of the embodiment shown in FIG. 1.
Figure 4:
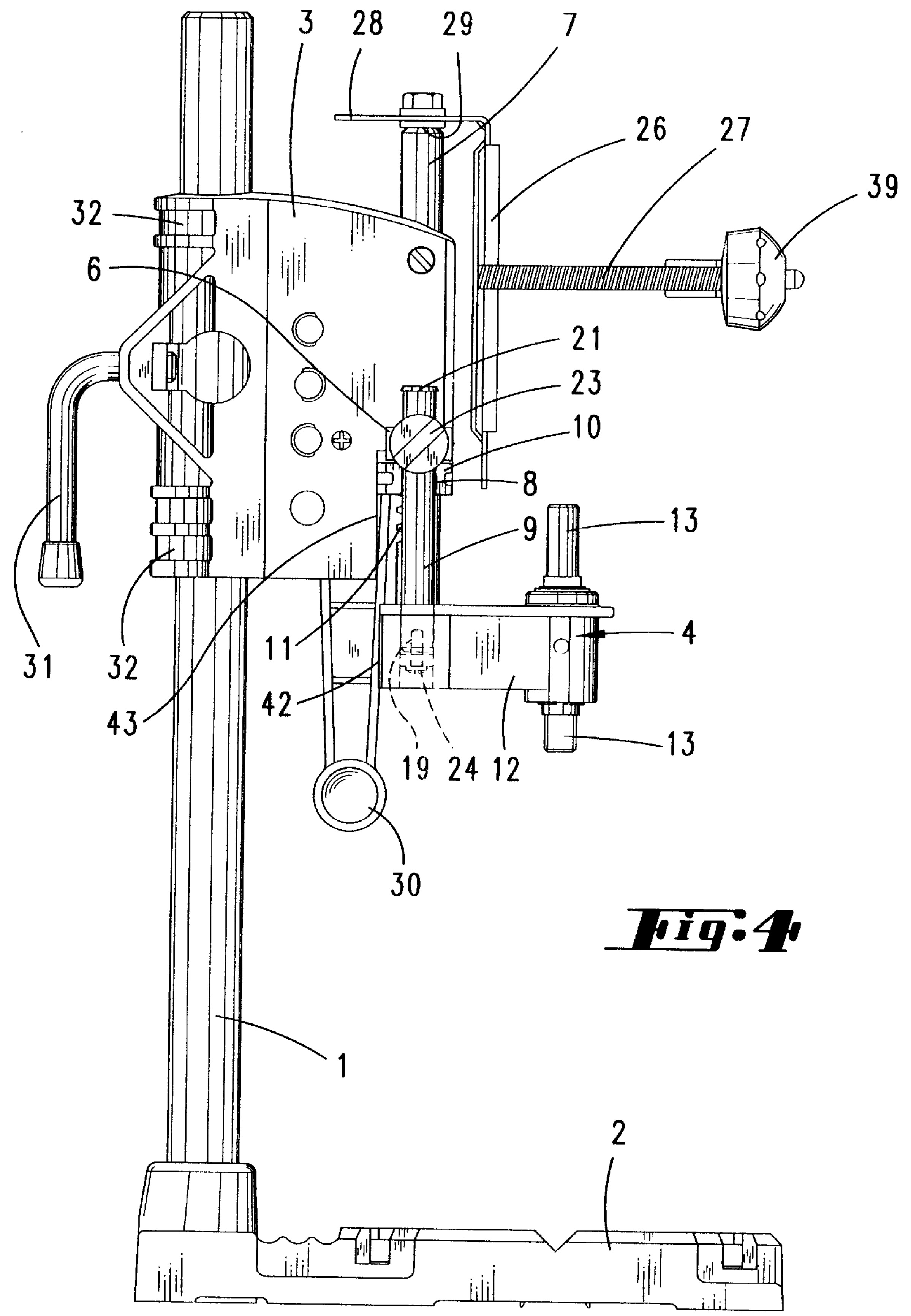
FIG. 4 is a view of the embodiment as shown in FIG. 2, but with the slide rod in a lowered position.
Figure 5:
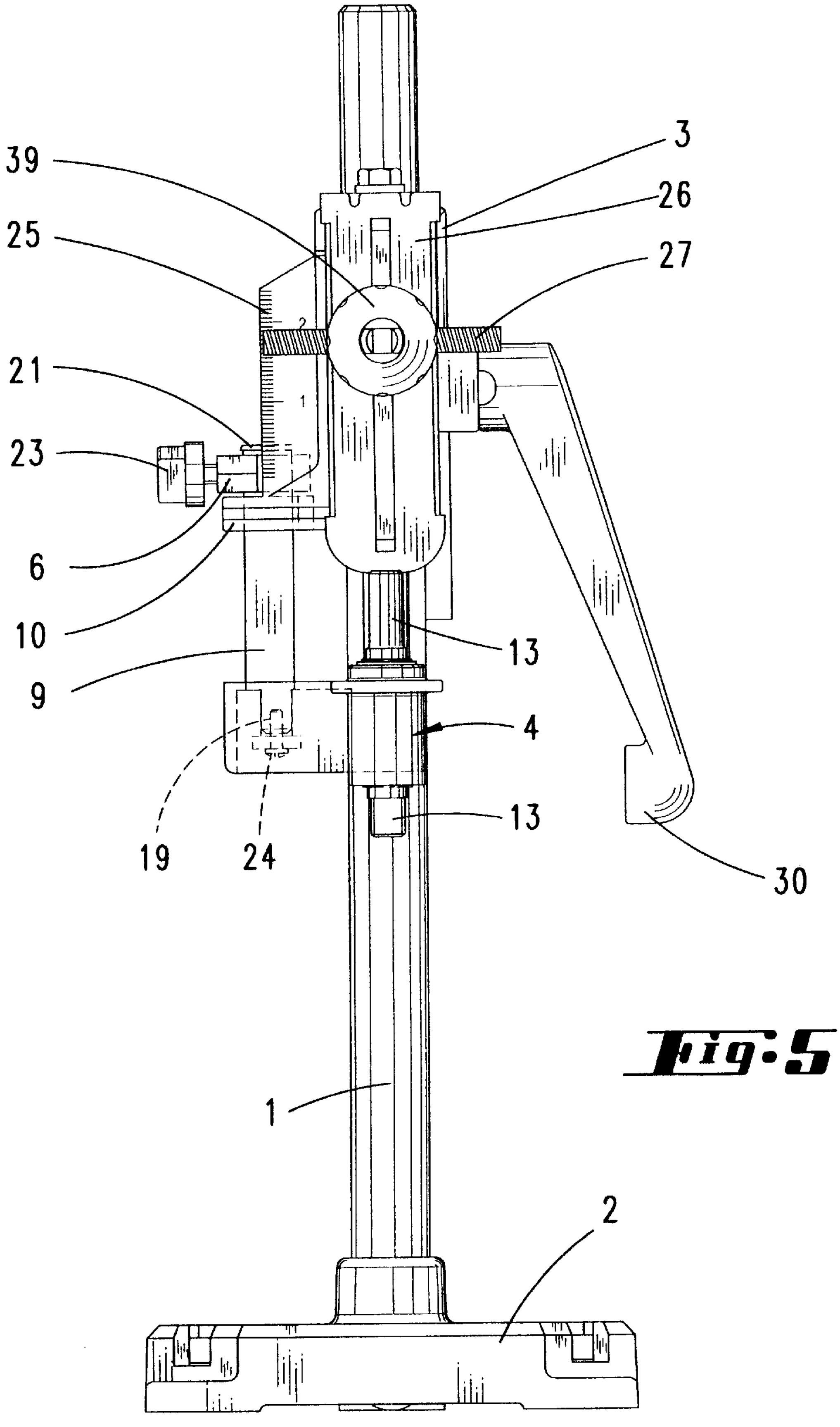
FIG. 5 is a side view of the embodiment as shown in FIG. 4.
Figure 6:
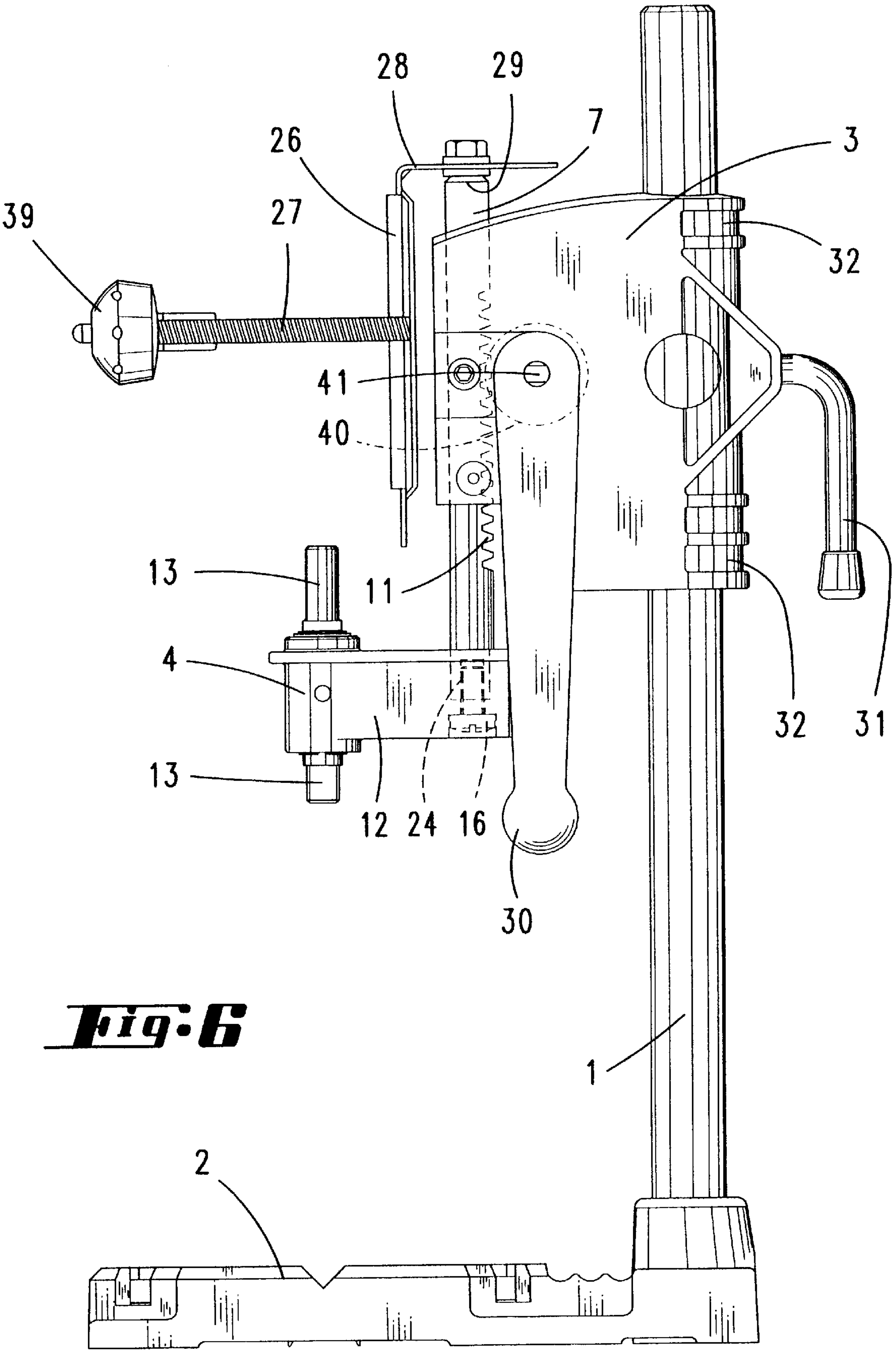
FIG. 6 is a rear view of the embodiment as shown in FIG. 4.
Figure 7:
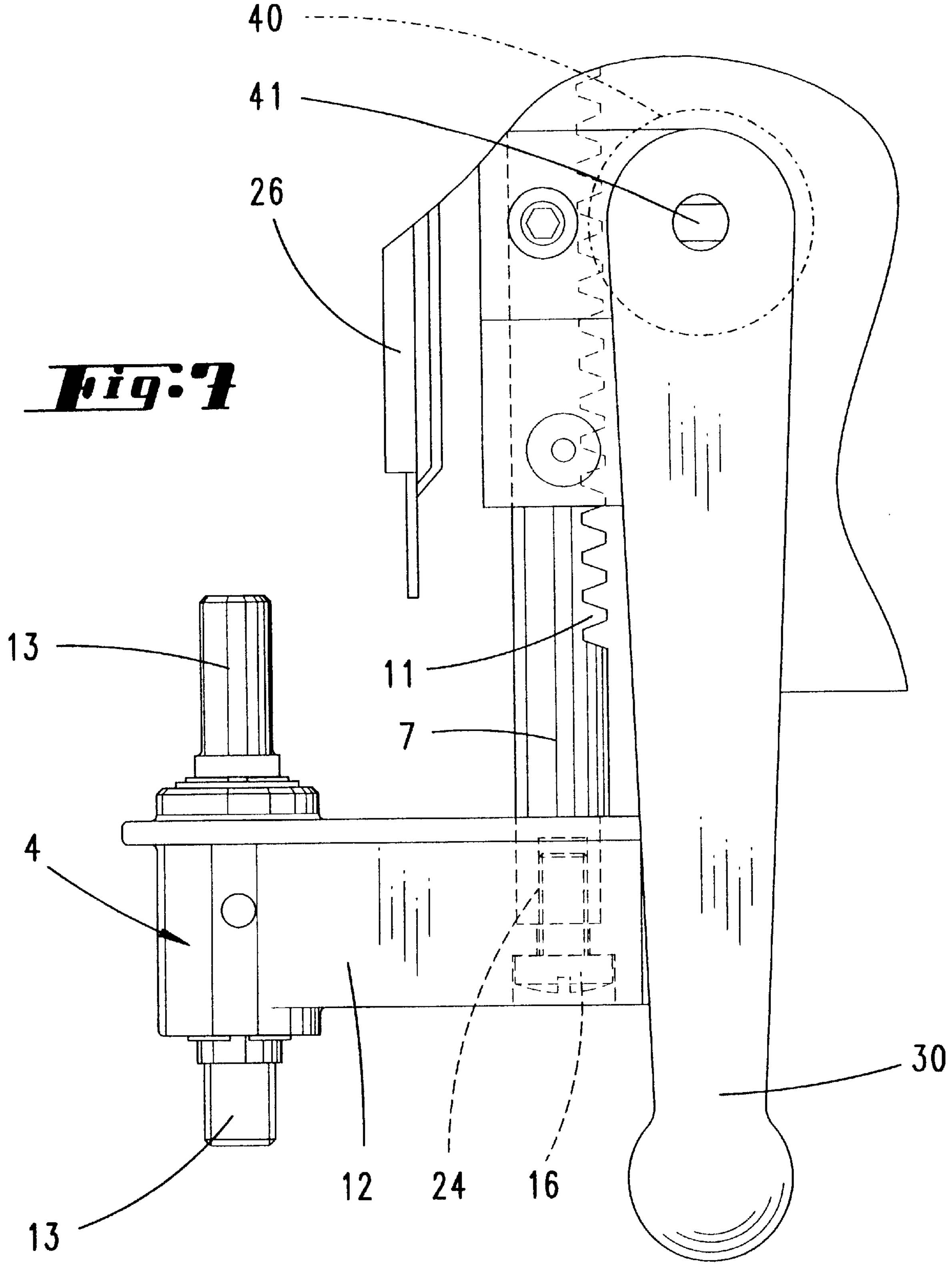
FIG. 7 is a partial view of the embodiment as shown in FIG. 6.
Figure 8:
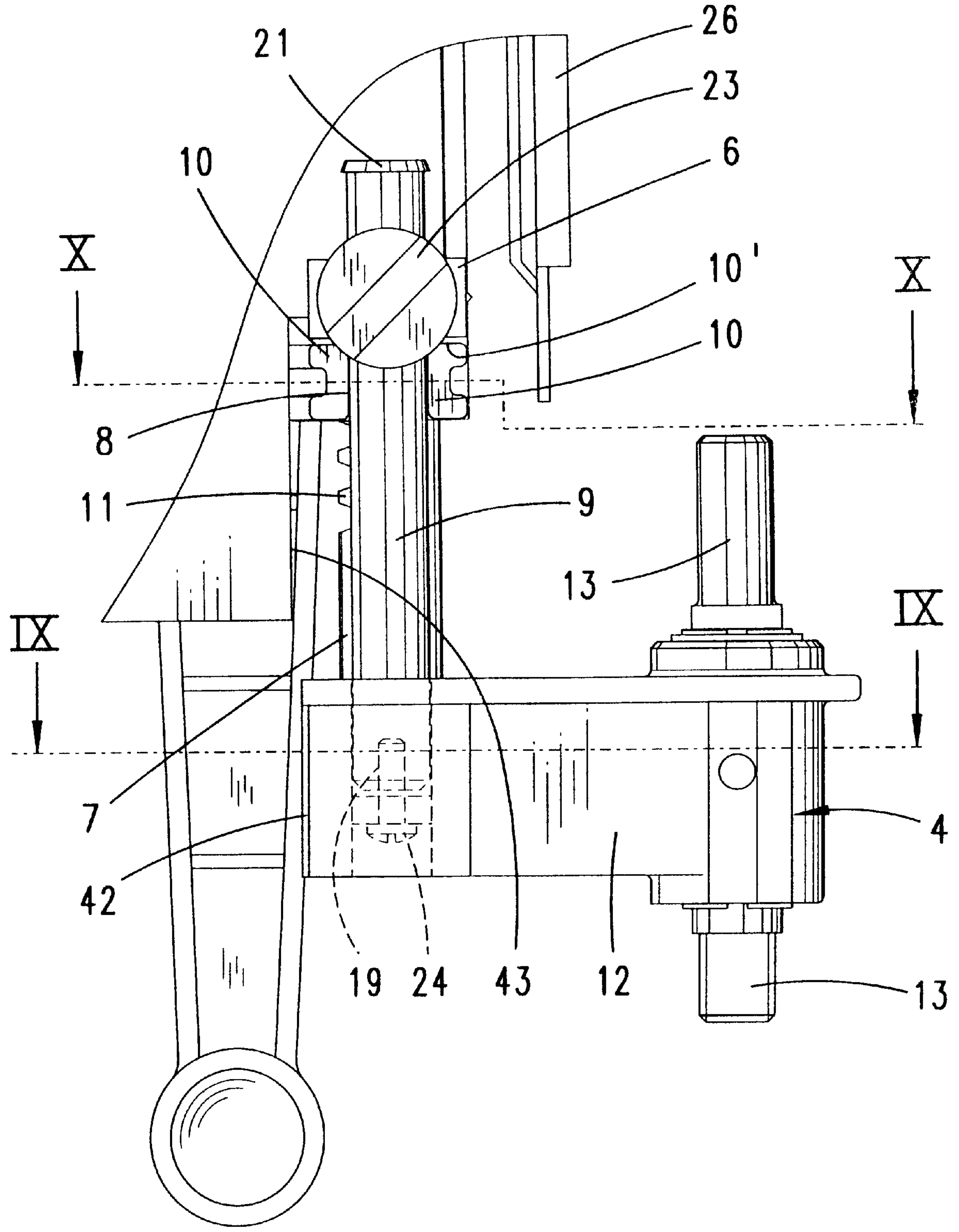
FIG. 8 is a partial view of the embodiment as shown in FIG. 4.
Figure 9:
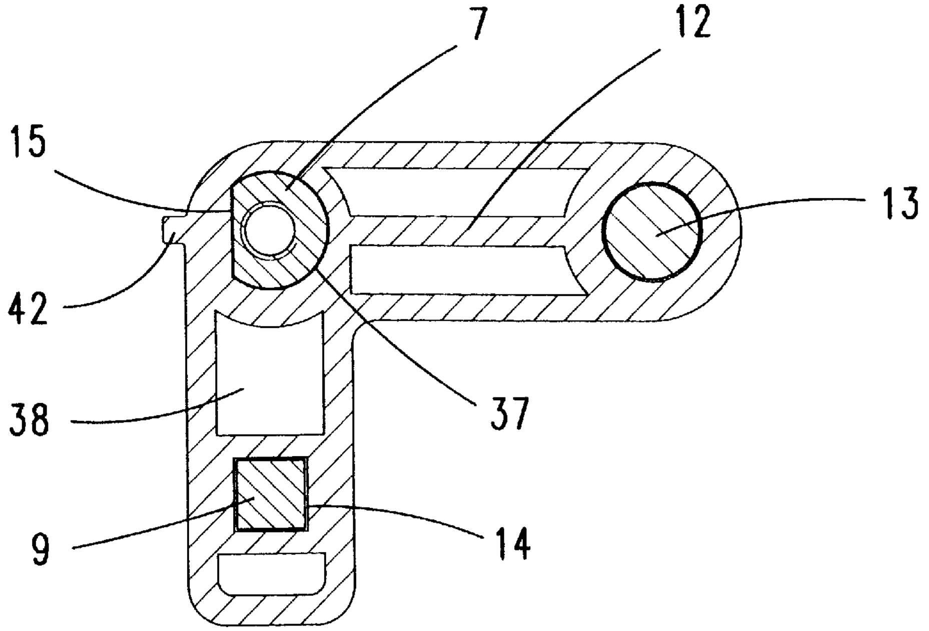
FIG. 9 is a sectional view taken substantially along line IX—IX of FIG. 8.
Figure 10:
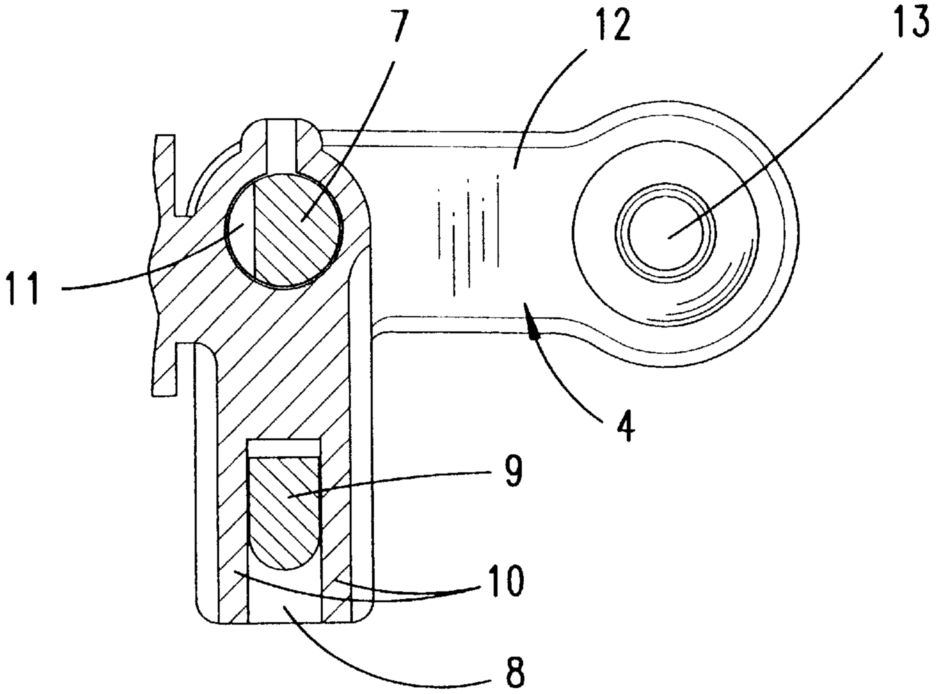
FIG. 10 is a sectional view taken substantially along line X—X of FIG. 8.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not limited to the particular embodiments illustrated herein.

DETAILED DESCRIPTION OF THE PRESENTLY PREFERRED EMBODIMENTS

Referring to FIGS. 1 to 6 collectively, a drill stand according to the present invention is illustrated in different views and two different operating positions.

The invention drill stand has a foot stand 2 that can be made of metal or plastic. A stand column 1 that runs vertically extends upward from the foot stand 2. The stand column 1 can be fashioned from a round bar made of metal. The bearer unit 3 can be made of plastic. It can consist of two plastic housing shells. The bearer unit 3 has guide eyes 32 through which the stand column 1 runs. Between the guide eyes 32, the bearer unit has a clamping screw 31 that comprises an angled-off actuating arm. By means of this clamping screw 31, the bearer unit 3 can be fastened at different heights on the stand column 1.

The bearer unit 3 bears a shaft 41, on whose end, which extends through a broad side of the housing of the bearer unit 3, there sits an actuating arm 30. Inside the housing, the shaft 41 bears a toothed segment 40 that can be fashioned as a toothed wheel. The shaft 41 is connected by means of a spiral-shaped reset spring 5. The other end of the reset spring 5 is connected to the housing, so that the actuating arm 30 and the toothed segment 40 driven thereby is always held in the position shown in FIG. 1, under pressure of the spring 5. If the actuating arm 30 is moved downward, the spring 5 becomes tense or compressed.

The toothed segment 40 acts on a toothing 11 of a slide rod 7. The slide rod 7 is arranged essentially parallel to the stand column 1, at a distance from it, and runs in a channel guide of the bearer unit 3. The slide rod 7 projects both upwards and downwards from the bearer unit 3. In the lower region, the slide rod 7 projects into an angle-shaped recess of the housing of the bearer unit 3. This angle-shaped recess forms a wall 43 that runs parallel to the path of motion of the slide rod 7, in the axial direction thereof.

Adjacent to the lower frontal end of the slide rod 7, a machine receiving part 4 is held by means of a screw 16 that can be screwed into the face of the slide rod 7. The machine receiving part 4 is fashioned with an angular shape, and has a first receiving limb 12, to which a drill or the like can be fastened. The machine receiving part 4 has a second angle limb that extends approximately in a right angle from the first angle limb 12. The plug-in opening 37 (see FIGS. 11–13) for the end of the slide rod 7 is located approximately at the point of the angle. At the end of the other receiving limb, a further plug-in opening 14 is located, into which a bit stop rail 9 can be plugged. The bit stop rail 9 can likewise be screwed to the machine receiving part 4 by means of a screw 24 that can be rotated in the face of the rail.

In the region located immediately above the above-specified angle-shaped recess, the bearer unit 3 forms a guide opening 8. This guide opening 8 is formed by two guide webs 10 that run parallel to one another. The bit stop rail 9 is guided in this guide opening 8. The guide opening 8 is fork-shaped.

The upper edge 10' of the webs 10 forms a stop surface for a bit stop 6 that sits on the bit stop rail 9.

Figure 11:
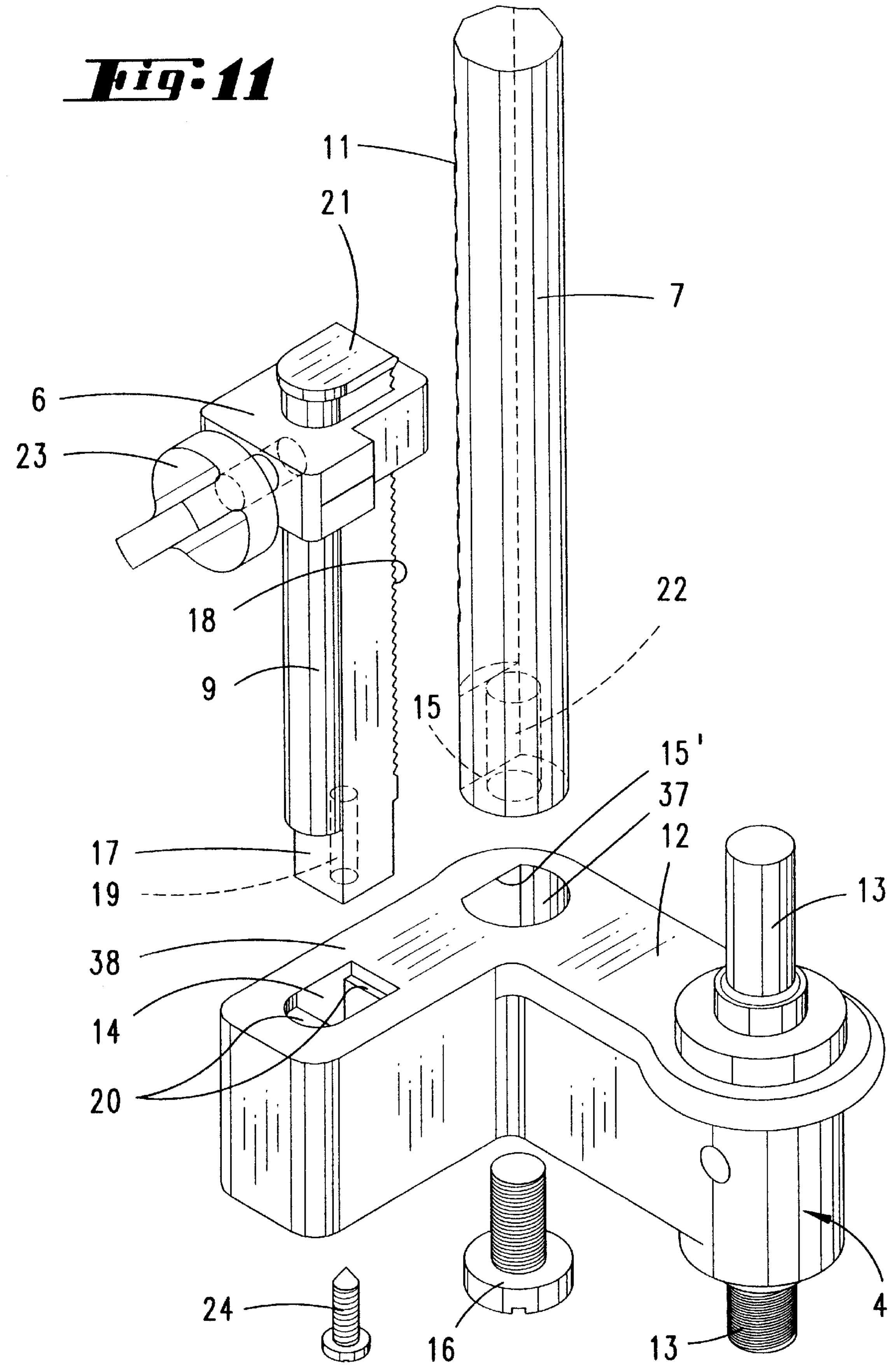
FIG. 11 is an exploded view of one machine receiving part of the present invention, together with the slide rod and bit stop rail.

As shown in FIG. 11, the bit stop 6 is fashioned as a shoe that is guided in displaceable fashion on the horseshoe-shaped bit stop rail 9. By means of a clamping screw 23, the shoe 6 can be fastened in different height positions on the bit stop rail 9. The housing has a scale 25 (see FIG. 3). A toothing 18 is provided on the back side of the bit stop rail 9. The inner surface of the recess of the bit stop 6 has a corresponding counter-toothing, and is pressed against it when the positioning screw 23 is tightened. The bit stop 6 cannot be pulled off over the head of the bit stop rail 9, because the head of the bit stop rail 9 has a collar 21. The plug-in end 17 of the bit stop rail 9 has a segment whose cross-section is altered. The plug-in end 17 has a cross-sectional shape that is essentially square, and can be plugged into a plug-in opening 14 of the machine receiving part 4 (see FIG. 11). In the plug-in opening 14, there are counter-sunk bearing shoulders 20. Corresponding countershoulders of the bit stop rail can lie on these bearing shoulders 20. The plug-in end 17 of the bit stop rail 9 has on its face a screw-in opening 19 into which the fastening screws 24 can be screwed, with which the bit stop rail 9 is axially secured to the machine receiving part 4.

Still referring to FIG. 11, the slide rail 7 has an essentially cylindrical structure, and has a toothing 11 on one of its sides. The lower frontal end of the slide rod 7 has a flattened part 15, so that the frontal end has a cross-sectional contour that deviates from the round. The plug-in opening 37 for the end of the slide rod 7 has a corresponding cross-sectional contour with a corresponding counterflattening 15'. In the frontal end of the slide rod 7 there is a threaded opening 22 into which the fastening screw 16 can be screwed, so that the machine receiving part 4 is fastened to the slide rod 7 in axially secure fashion.

While not shown in FIG. 11, the opposite-lying end of the slide rod 7 likewise may have a threaded opening on its face for a screw. With this screw, a fastening limb 28 of a mounting bracket 26 is fastened to the slide rod (see FIG. 1). The mounting bracket serves to mount the housing of a machine (FIG. 1) so that the machine can be moved vertically, together with the slide rod. The mounting bracket 26 has a mounting loop 27. By means of a tension nut 39, the mounting loop 27 can be pulled tight, and a machine can be braced to the mounting bracket 26.

By loosening the screw 16, the machine receiving part 4 can be separated from the slide rod 7. The machine receiving part 4 can be removed from the bearer unit 3 together with the bit stop rail 9, since the guide opening 8 is open towards the side. The machine receiving part 4 can be exchanged with differently constructed machine receiving parts.

Figure 12:
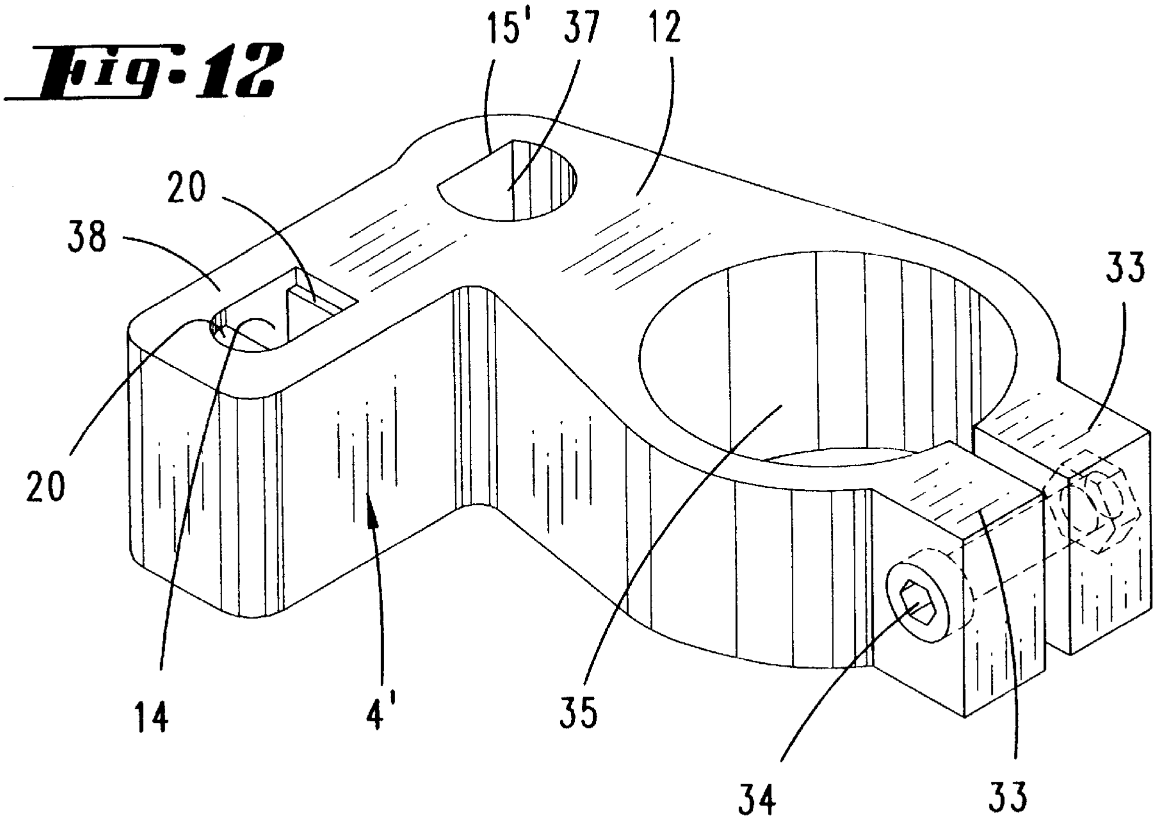
FIG. 12 is a perspective view of a second embodiment of a machine receiving part made in accordance with the present invention.
Figure 13:
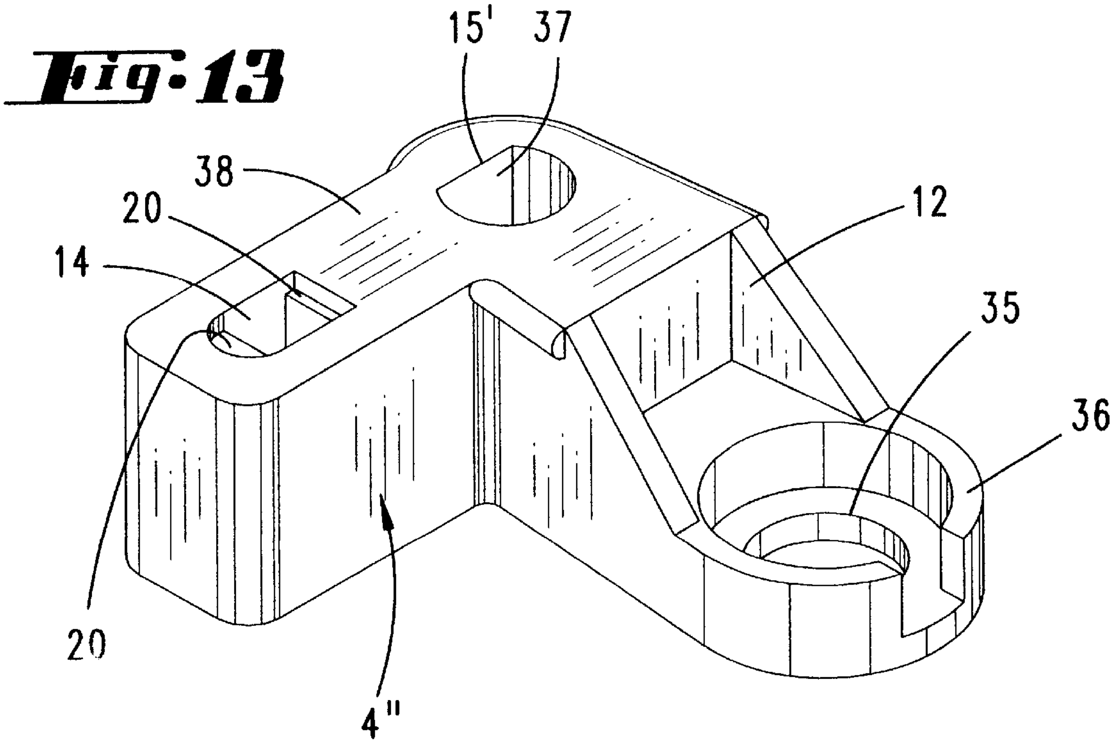
FIG. 13 is a perspective view of a third embodiment of a machine receiving part made in accordance with the present invention.

FIGS. 12 and 13 show examples of differently constructed machine receiving parts.

In order to exchange the machine receiving parts 4 with, e.g., the machine receiving part 4', the screw 24 is loosened, so that the bit stop rail 9 can be withdrawn from its plug-in opening 14.

The plug-in end 17 of the bit stop rail 9 can then be plugged into a plug-in opening 14 of the machine receiving part 4'or 4".

The machine receiving part 4' shown in FIG. 12 has on its receiving limb 1 a receiving opening 35 with a circularly round cross-section. The diameter of the receiving opening 35 can be modified slightly. Clamping jaws 33, which can be tightened against one another by means of a tension screw 34, serve for this purpose.

In the machine receiving part 4", shown in FIG. 13, the receiving limb 12 has a circularly round receiving opening 35, to which a collar 36 is integrally joined so as to form a step. In the exemplary embodiments according to FIGS. 12 and 13, the mounting apparatus screwed onto the slide rod head 29, consisting of the mounting bracket 26, can be omitted, since the machine housing can be fastened to the receiving opening 35.

In the exemplary embodiment of a machine receiving part shown in FIGS. 7 to 11, the receiving limb 12 has at its end side a shaft 13 mounted on bearings, which can be coupled with the drill chuck of a drive machine.

In order to effect an improved guiding of the machine receiving part 4 to the bearer unit 3, the machine receiving part has a backwards guide rib 42 (see FIGS. 8–9), which is supported against the wall 43 of the bearer unit 3.

Figure 14:
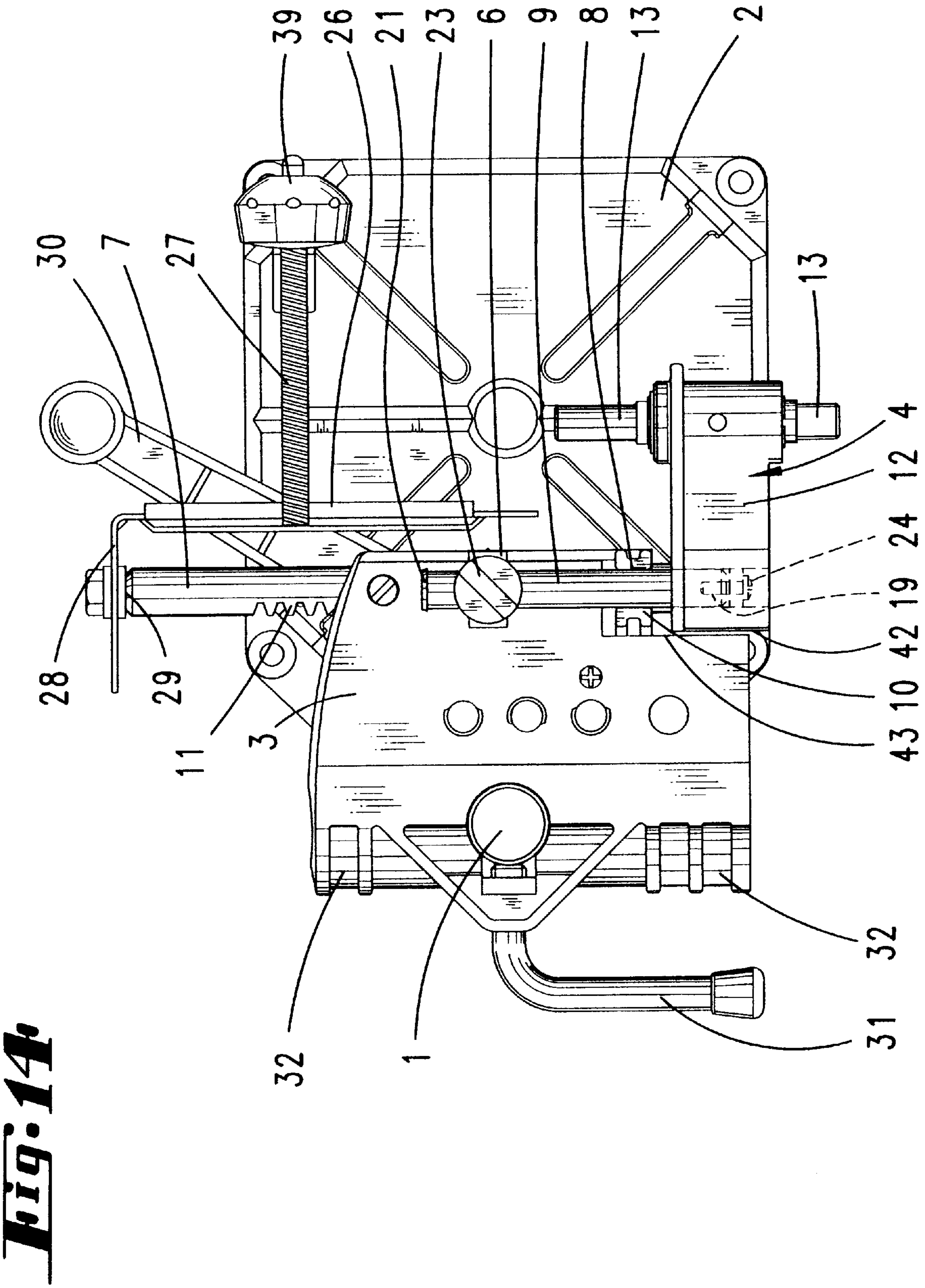
FIG. 14 is a plan view of another embodiment of the present invention in which the drive shaft lies horizontally.

In the variant assembly shown in FIG. 14, the stand column 1 is plugged through a circular opening that cuts the broad sides of the bearer unit 3. This circular opening is located in the operating area of the clamping screw 31. In the position shown in FIG. 14, the shaft 13 or, respectively, the slide rod 7 is positioned horizontally, so that the electric machine or, respectively, the machine receiving part 4 can be moved in the horizontal direction by actuating the actuating arm 30. This variant assembly is preferably suited for the grinding processing of work pieces.

In the disclosure of the application, the content of the disclosure of the associated/enclosed priority documents (copy of the prior application) is hereby also included in its full content, also for the purpose of incorporating features of these documents into claims of the present application.

From the above description, it is apparent that the objects and advantages of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed:

1. A drill stand comprising:

a stand column slidably connected to a bearer unit so that a position of the bearer unit on the stand column may be adjusted, the bearer unit comprising a gear segment, the gear segment being enmeshed with geared slide rod, the slide rod being removably connected to a machine receiving part, the gear segment being engaged by a reset spring, the reset spring biasing the gear segment, the slide rod and the machine receiving part into a first withdrawn position, rotation of gear segment with respect to the bearer unit against the bias of the reset spring resulting in movement of the slide rod and machine receiving part towards a second extended position, the machine receiving part being removably connected to a bit stop rail, the bit stop rail being connected a bit stop, the position of the bit stop along the bit stop rail being adjustable, movement of the machine receiving part towards the second extended position being limited by engagement of the bit stop with the bearer unit.

2. The drill stand of claim 1 further comprising a first fastener for removably connecting the machine receiving part to the slide rod and a second fastener for removably connecting the machine receiving part to the bit stop rail.

3. The drill stand of claim 1 wherein the bearer unit further comprises a guide opening, the bit stop rail extends parallel to the slide rod and through the guide opening, movement of the machine receiving part towards the second extended position being limited by engagement of the bit stop with the bearer unit at the guide opening.

4. The drill stand of claim 3 wherein the guide opening further comprises a space disposed between two guide webs, movement of the machine receiving part towards the second extended position being limited by engagement of the bit stop with the guide webs of the guide opening.

5. The drill stand of claim 1 wherein the machine receiving part comprises a first receiving limb for connection to a tool and a second receiving limb for connection to the bit stop rail, the slide rod being connected to the machine receiving part between the bit stop rail and the tool.

6. The drill stand of claim 1 wherein the machine receiving part comprises a first receiving limb for connection to a tool and a second receiving limb for connection to the bit stop rail and the slide rod.

7. The drill stand of claim 1 wherein the machine receiving part comprises a first plug-in opening for receiving an end segment of the slide rod and a second plug-in opening for receiving an end segment of the bit stop rail.

8. The drill stand of claim 7 wherein the first plug-in opening comprises at least one bearing shoulder.

9. The drill stand of claim 1 wherein the slide-rod is connected to the machine receiving part by a screw.

10. The drill stand of claim 1 wherein the bit stop rail is connected to the machine receiving part by a screw.

11. The drill stand of claim 1 wherein the bit stop is fashioned as a shoe that can be positioned on the bit stop rail by means of a positioning screw.

12. The drill stand of claim 1 wherein the bearer unit further comprises a wall disposed adjacent to the bit stop, the wall comprising a scale for indicating the position of the bit stop with respect to the bearer unit.

13. The drill stand of claim 1 wherein the machine receiving part comprises a receiving limb having a receiving opening with clamping jaws for connecting the machine receiving part to a tool.

14. The drill stand of claim 1 wherein the machine receiving part comprises a receiving limb having a receiving opening with a collar.

15. The drill stand of claim 1 wherein the bit stop rail comprises an end that is connected to the machine receiving part, said end having a non-circular cross section.

16. The drill stand of claim 1 wherein the slide rod comprises an end that is connected to the machine receiving part, said end having a non-circular cross section.

17. The drill stand of claim 1 wherein the slide rod is perpendicular to the stand column.

18. The drill stand of claim 1 wherein the slide rod is parallel to the stand column.

19. The drill stand of claim 1 wherein the bearer unit is held in position against the stand column with a clamping screw.

20. A drill stand comprising:

a vertical stand column slidably connected to a bearer unit so that a position of the bearer unit on the stand column may be adjusted, the bearer unit being held in position against the stand column with a clamping screw the bearer unit comprising a gear segment, the gear segment being enmeshed with vertical geared slide rod, the slide rod being threadably connected to a machine receiving part, the bearer unit and the gear segment each engaging a reset spring, the reset spring biasing the gear segment, the slide rod and the machine receiving part into a first withdrawn position, rotation of gear segment with respect to the bearer unit against the bias of the reset spring resulting in movement of the slide rod and machine receiving part towards a second extended position, the machine receiving part further being threadably connected to a bit stop rail, the bit stop rail extending through a guide opening in the bearer unit, the bit stop rail being connected a bit stop, the position of the bit stop along the bit stop rail being adjustable, the bearer unit further comprises a wall disposed adjacent to the bit stop, the wall comprising a scale for indicating the position of the bit stop with respect to the bear unit, movement of the machine receiving part towards the second extending position being limited by engagement of the bit stop with the bearer unit at the guide opening, the drill stand further comprising a first fastener for removably connecting the machine receiving part to the slide rod and a second fastener for removably connecting the machine receiving part to the bit stop rail.

* * * * *